US011553338B2

(12) United States Patent
Higley et al.

(10) Patent No.: US 11,553,338 B2
(45) Date of Patent: Jan. 10, 2023

(54) AUTOMATIC BUILDING SYSTEM CONTROL RESTRICTIONS BASED ON PHYSICAL PRESENCE DEFINED BY ACCESS CONTROL EVENT INFORMATION AND KNOWLEDGE BASE SYSTEM

(71) Applicant: Carrier Corporation, Palm Beach Gardens, FL (US)

(72) Inventors: Jason Higley, Pittsford, NY (US); Fabrizio Smith, Rome (IT)

(73) Assignee: CARRIER CORPORATION, Palm Beach Gardens, FL (US)

( * ) Notice: Subject to any disclaimer, the term of this patent is extended or adjusted under 35 U.S.C. 154(b) by 243 days.

(21) Appl. No.: 16/635,325

(22) PCT Filed: Aug. 10, 2018

(86) PCT No.: PCT/US2018/046173
§ 371 (c)(1),
(2) Date: Jan. 30, 2020

(87) PCT Pub. No.: WO2019/036282
PCT Pub. Date: Feb. 21, 2019

(65) Prior Publication Data
US 2020/0374697 A1 Nov. 26, 2020

Related U.S. Application Data

(60) Provisional application No. 62/545,543, filed on Aug. 15, 2017.

(51) Int. Cl.
*H04W 12/06* (2021.01)
*G05B 19/042* (2006.01)
*H04L 9/40* (2022.01)

(52) U.S. Cl.
CPC .......... *H04W 12/06* (2013.01); *G05B 19/042* (2013.01); *H04L 63/08* (2013.01); *G05B 2219/25011* (2013.01)

(58) Field of Classification Search
CPC .......................................... G05B 2219/25011
See application file for complete search history.

(56) References Cited

U.S. PATENT DOCUMENTS 9,280,765 B2* 3/2016 Hammad ........... G06Q 20/3674
9,526,153 B2* 12/2016 Noori .................. F21V 23/0435
(Continued)

FOREIGN PATENT DOCUMENTS

CN 1835438 A 3/2006
CN 105430102 A 3/2016

OTHER PUBLICATIONS

Ducreux et al "Dynamic Reconfiguration of Building Automation Systems with LINC," Sensors & Transducers, vol. 185, Issue 2, Feb. 28, 2015, pp. 68-77 (Year: 2015).*
(Continued)

*Primary Examiner* — Luu T Pham
*Assistant Examiner* — James J Wilcox
(74) *Attorney, Agent, or Firm* — Cantor Colburn LLP

(57) ABSTRACT

A method of controlling a building system is provided. The method comprising: receiving an action request to adjust a building device from a user device; obtaining a token from a previous action request from the user device to adjust the building device when a token exists from a previous action request; transmitting the token for validation within the building device; and adjusting the building device when the token has been validated.

17 Claims, 2 Drawing Sheets

(56) References Cited

U.S. PATENT DOCUMENTS

| | | | |
|---|---|---|---|
| 10,158,626 B1* | 12/2018 | Ji | G06F 3/0685 |
| 10,510,222 B2* | 12/2019 | Eddins | G08B 5/36 |
| 10,867,487 B2* | 12/2020 | Eddins | H05B 47/175 |
| 11,042,135 B1* | 6/2021 | Rolston | G05B 15/02 |
| 2008/0092211 A1* | 4/2008 | Klemets | H04L 9/3247 |
| | | | 713/176 |
| 2011/0296164 A1* | 12/2011 | Boebert | G06F 21/604 |
| | | | 709/225 |
| 2014/0075513 A1 | 3/2014 | Trammel et al. | |
| 2014/0259106 A1 | 9/2014 | Barrus | |
| 2014/0310792 A1 | 10/2014 | Hyland et al. | |
| 2015/0001930 A1* | 1/2015 | Juntunen | H02M 7/217 |
| | | | 307/24 |
| 2015/0141005 A1* | 5/2015 | Suryavanshi | H04W 48/16 |
| | | | 455/434 |
| 2015/0366039 A1* | 12/2015 | Noori | H04L 12/2818 |
| | | | 315/307 |
| 2016/0095189 A1* | 3/2016 | Vangeel | H05B 45/18 |
| | | | 315/152 |
| 2017/0195429 A1 | 7/2017 | Bokare et al. | |
| 2018/0146369 A1* | 5/2018 | Kennedy, Jr. | H04W 12/04 |
| 2018/0151034 A1* | 5/2018 | Eddins | H05B 47/175 |
| 2018/0276041 A1* | 9/2018 | Bansal | G06F 11/30 |
| 2020/0126372 A1* | 4/2020 | Eddins | H05B 45/20 |
| 2020/0273268 A1* | 8/2020 | Bhattacharyya | H04W 4/40 |
| 2020/0374697 A1* | 11/2020 | Higley | G06F 21/41 |
| 2021/0185472 A1* | 6/2021 | Klein | H04L 67/34 |

OTHER PUBLICATIONS

Bandara et al ("Bandara," "Access Control Framework for API-Enabled Devices in Smart Buildings," The 22nd Asia-Pacific Conference on Communications (APCC2016), pp. 210-217). (Year: 2016).*

Pacheco et al. "IoT Security Framework for Smart Cyber Infrastructures," 2016 IEEE 1st International Workshops on Foundations and Applications of Self Systems, 2016, IEEE Computer Society, pp. 242-247 (Year: 2016).*

Chen et al "The Design and Implementation of a Smart Building Control System," 2009 IEEE International Conference on e-Business Engineering, 2009, IEEE Computer Society, pp. 255-262 (Year: 2009).*

Written Opinion of the International Searching Authority for International Application No. PCT/US2018/046173; dated Oct. 17, 2018; 10 pages.

Notification of Transmittal of the International Search Report for International Application No. PCT/US2018/046173; dated Oct. 17, 2018; 5 pages.

First Office Action dated Nov. 18, 2021 for Application 201880052967.0; Office Action dated Nov. 18, 2021; 8 pages.

* cited by examiner

AUTOMATIC BUILDING SYSTEM CONTROL RESTRICTIONS BASED ON PHYSICAL PRESENCE DEFINED BY ACCESS CONTROL EVENT INFORMATION AND KNOWLEDGE BASE SYSTEM

CROSS-REFERENCE TO RELATED APPLICATIONS

This application is based on International Application No. PCT/US2018/046173 filed Aug. 10, 2018, which claims priority to U.S. Provisional Patent Application Ser. No. 62/545,543 filed Aug. 15, 2017, both of which are incorporated herein by reference in their entirety.

BACKGROUND

The subject matter disclosed herein generally relates to the field of building systems, and more particularly to an apparatus and method for controlling building devices.

Existing building devices may allow for control of building devices through a remote device but control may be slow and repetitive.

BRIEF SUMMARY

According to one embodiment, a method of controlling a building system is provided. The method comprising: receiving an action request to adjust a building device from a user device; obtaining a token from a previous action request from the user device to adjust the building device when a token exists from a previous action request; transmitting the token for validation within the building device; and adjusting the building device when the token has been validated.

In addition to one or more of the features described above, or as an alternative, further embodiments may include: transmitting an adjustment acknowledgement to the user device when the building device has been adjusted.

In addition to one or more of the features described above, or as an alternative, further embodiments may include: activating an alarm on the user device with the adjustment acknowledgement is received.

In addition to one or more of the features described above, or as an alternative, further embodiments may include: displaying the adjustment acknowledgment on the user device when the adjustment acknowledgement is received.

In addition to one or more of the features described above, or as an alternative, further embodiments may include that prior to the receiving, the method further comprises: receiving a mobile credential from a user device; authorizing the mobile credential; determining a current position of the user device; mapping a building device list at the current position, the building device list including one or more building devices adjustable at the current position; generating a token for use with each building device; transmitting the token and the building device list to the user device; receiving a previous action request with the token to adjust a building device from a user device; validating the token with the building device; and adjusting the building device when the token has been validated.

In addition to one or more of the features described above, or as an alternative, further embodiments may include that prior to the receiving, the method further comprises: receiving a mobile credential from a user device; denying the mobile credential; transmitting the denial to the user device; receiving a previous action request with no token to adjust a building device from a user device; and denying the previous action request.

In addition to one or more of the features described above, or as an alternative, further embodiments may include: denying the action request and not adjusting the building device when previous action request has been denied.

According to another embodiment, a building control system is provided. The building control system comprising: a processor; and a memory comprising computer-executable instructions that, when executed by the processor, cause the processor to perform operations, the operations comprising: receiving an action request to adjust a building device from a user device; obtaining a token from a previous action request from the user device to adjust the building device when a token exists from a previous action request; transmitting the token for validation within the building device; and adjusting the building device when the token has been validated.

In addition to one or more of the features described above, or as an alternative, further embodiments may include that the operations further comprise: transmitting an adjustment acknowledgement to the user device when the building device has been adjusted.

In addition to one or more of the features described above, or as an alternative, further embodiments may include that the operations further comprise: activating an alarm on the user device with the adjustment acknowledgement is received.

In addition to one or more of the features described above, or as an alternative, further embodiments may include that the operations further comprise: displaying the adjustment acknowledgment on the user device when the adjustment acknowledgement is received.

In addition to one or more of the features described above, or as an alternative, further embodiments may include that prior to the receiving, the operations further comprises: receiving a mobile credential from a user device; authorizing the mobile credential; determining a current position of the user device; mapping a building device list at the current position, the building device list including one or more building devices adjustable at the current position; generating a token for use with each building device; transmitting the token and the building device list to the user device; receiving a previous action request with the token to adjust a building device from a user device; validating the token with the building device; and adjusting the building device when the token has been validated.

In addition to one or more of the features described above, or as an alternative, further embodiments may include that prior to the receiving, the operations further comprises: receiving a mobile credential from a user device; denying the mobile credential; transmitting the denial to the user device; receiving a previous action request with no token to adjust a building device from a user device; and denying the previous action request.

In addition to one or more of the features described above, or as an alternative, further embodiments may include that the operations further comprise: denying the action request and not adjusting the building device when previous action request has been denied.

According to another embodiment, a computer program product tangibly embodied on a computer readable medium is provided. The computer program product including instructions that, when executed by a processor, cause the processor to perform operations comprising: receiving an action request to adjust a building device from a user device;

obtaining a token from a previous action request from the user device to adjust the building device when a token exists from a previous action request; transmitting the token for validation within the building device; and adjusting the building device when the token has been validated.

In addition to one or more of the features described above, or as an alternative, further embodiments may include that the operations further comprise: transmitting an adjustment acknowledgement to the user device when the building device has been adjusted.

In addition to one or more of the features described above, or as an alternative, further embodiments may include that the operations further comprise: activating an alarm on the user device with the adjustment acknowledgement is received.

In addition to one or more of the features described above, or as an alternative, further embodiments may include that the operations further comprise: displaying the adjustment acknowledgment on the user device when the adjustment acknowledgement is received.

In addition to one or more of the features described above, or as an alternative, further embodiments may include that prior to the receiving, the operations further comprises: receiving a mobile credential from a user device; authorizing the mobile credential; determining a current position of the user device; mapping a building device list at the current position, the building device list including one or more building devices adjustable at the current position; generating a token for use with each building device; transmitting the token and the building device list to the user device; receiving a previous action request with the token to adjust a building device from a user device; validating the token with the building device; and adjusting the building device when the token has been validated.

In addition to one or more of the features described above, or as an alternative, further embodiments may include that prior to the receiving, the operations further comprises: receiving a mobile credential from a user device; denying the mobile credential; transmitting the denial to the user device; receiving a previous action request with no token to adjust a building device from a user device; and denying the previous action request.

In addition to one or more of the features described above, or as an alternative, further embodiments may include that the operations further comprise: denying the action request and not adjusting the building device when previous action request has been denied.

Technical effects of embodiments of the present disclosure include monitoring a person's use of buildings devices and adjusting building devices without passage of a token based upon past usage of the building devices.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
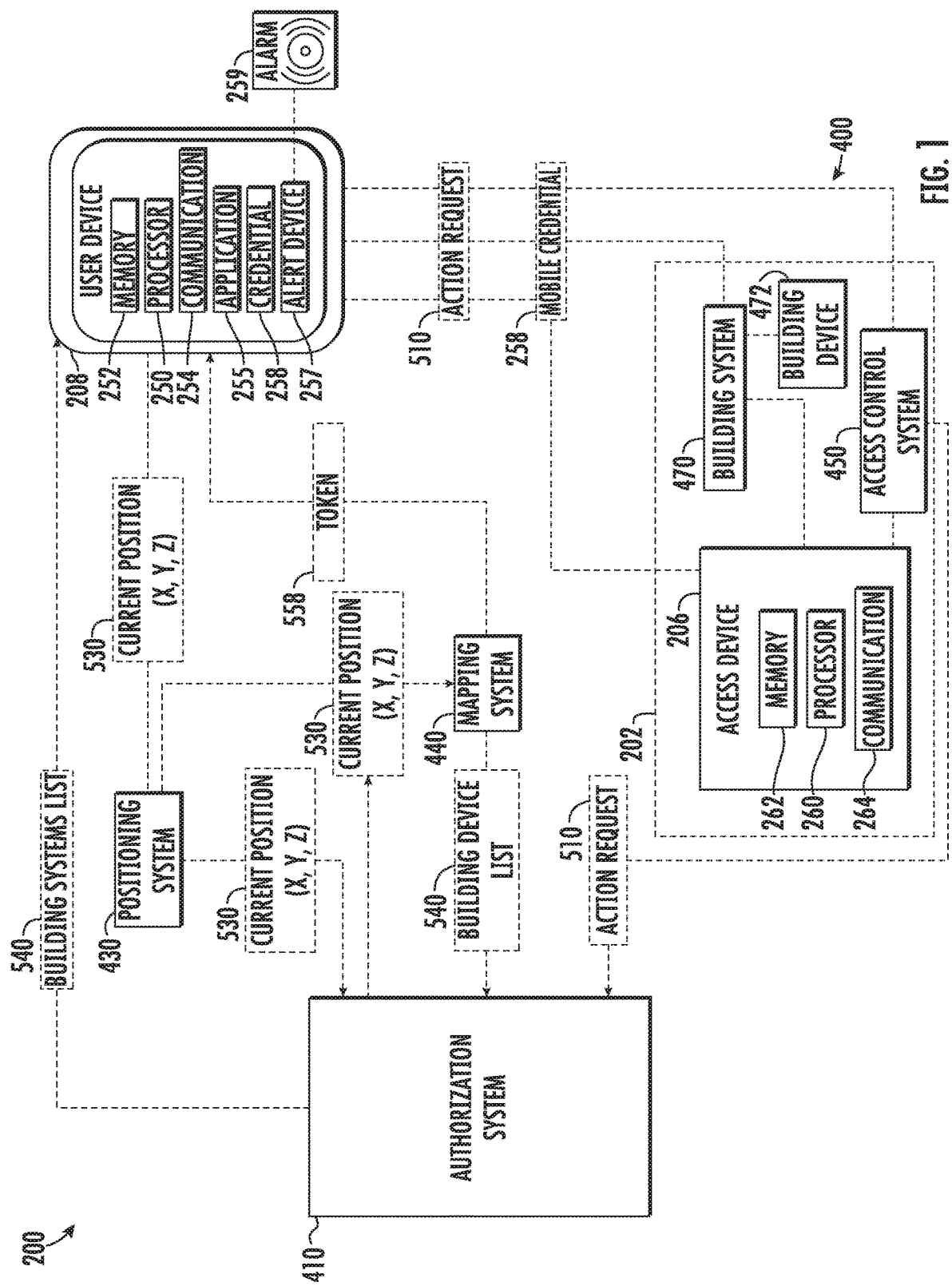
FIG. 1 illustrates a schematic view of a building control system, in accordance with an embodiment of the disclosure.

FIG. 1 depicts a building control system 200 in an example embodiment. The building control system 200 includes a user device 208. The user device 208 is capable of secure bi-directional communication with an access device 206, a positioning system 430, and a plurality of interconnected systems 400. The user device 208 may be a computing device such as a desktop computer. The user device 208 may also be a mobile computing device that is typically carried by a person, such as, for example a phone, PDA, smart watch, tablet, laptop, etc. The user device 208 may also be two separate devices that are synced together such as, for example, a cellular phone and a desktop computer synced over an internet connection. The user device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the user device 208 including executable instructions stored therein, for instance, as firmware. The communication module 254 may implement one or more communication protocols as described in further detail herein. The user device 208 is configured to store a unique mobile credential 258 that may be shared with the access device 206 and a plurality of interconnected systems 400, discussed further below. In a non-limiting example, the user device 208 may belong to an employee and/or resident of the building 202. The user device 208 may include an alert device 257 configured to activate an alarm 259. In three non-limiting examples, the alert device 257 may be a vibration motor, audio speaker, and/or display screen. The alarm 259 may be audible, visual, haptic, and/or vibratory. The user device 208 may also include an application 255. Embodiments disclosed herein, may operate through the application 255 installed on the user device 208.

As shown in FIG. 1, the building control system 200 also includes a plurality of interconnected systems 400 including: a positioning system 430, a building system 470, one or more building devices 472, a mapping system 440, an access control system 450, and an authorization system 410. In the illustration of FIG. 1, the interconnected systems 400 are illustrated as separate systems. In an embodiment, at least one of the positioning system 430, the building system 470, one or more building devices 472, the mapping system 440, the access control system 450, and the authorization system 410 may be combined into a single system. In another embodiment, at least one of the positioning system 430, the building system 470, one or more building devices 472, the mapping system 440, the access control system 450, and the authorization system 410.

The interconnected systems 400 may each include a processor, memory and communication module. For ease of illustration, the processor, memory, and communication module are not shown in FIG. 1. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware. The communication module may implement one or more communication protocols as described in further detail herein.

The positioning system 430 is configured to determine a current position 530 of the user device 208. The current position 530 includes the (x, y, z) coordinates of the user device 208 on a map. The (x, y, z) coordinates may translate to a latitude, a longitude, and an elevation. The positioning system 430 may use various methods in order to determine the current position 530 of the user device 208 such as, for example, GPS, Bluetooth triangulation, Wi-Fi triangulation, cellular signal triangulation, or any other location determination method known to one of skill in the art. The positioning system 430 is configured to transmit the current position 530 to the user device 208 and at least one of the authorization system 410 and the mapping system 440. The authorization system 410 and the audit system 460 is configured to receive the current position 530 from the positioning system 430. The current position 530 may also be determined in response to a strength of signal detected between the user device 208 and any one of the interconnected systems 400.

The mapping system 440 is configured to store the (x, y, z) coordinates of access devices 206 and building devices 472. When the mapping system 440 is provided with the current position 530 of a user device, the mapping system 440 is configured determine a building device list 540 in response to the current position 540. The building device list 540 includes what building devices 472 a user may have access to depending upon the current position 530. For example, if a user enters conference room A, the current position 530 show that the user is in Conference Room A and the mapping system 440 will determine all the building devices 472 available to the user in conference room A in a building device list 540. The building device list 540 may then be displayed upon the user device 208 through an application 255 and the user may select a building device 472 to control on the building device list 540 through the application 255.

The building system 470 may include one or more individual controlled building devices 472 including but not limited to lights, thermostat, blinds, cabinet locks, computers . . . etc. The building system 470 is configured to receive an action request 510 from the user device 208 and then adjust the building device 472 in response to the action request 510. The building system 470 may translate communication between the user device 208 and the building device 472, which may be may be different manufacturers and utilize different languages. In some embodiment, the user device 208 may communicate directly to each building device 472 and not through the building system 470. In one example, the action request 510 may be to dim the lights and thus the building system may dim the lights in response to the action requests 510.

The building control system 200 includes at least one access device 206 to communicate with and help adjust the building systems 470. The adjustments may include, but are not limited to, turning lights on/off, adjusting the strength of lights, adjusting the color of lights, increasing/decreasing the temperatures, opening/closing the blinds, powering on/off a computer . . . etc. The building system 470 and building devices 472 may be installed at a building 202. In some embodiments, the building 202 may be a building or a collection of buildings that may or may not be physically located near each other. The building 202 may include any number of floors.

Each of the action requests 510 are transmitted to the authorization system 410. The authorization system 410 is configured to receive and store the action requests 460. The building systems 470 may be operably connected to one or more access devices 206 configured to coordinate control the building devices 472. The access device 206 may communicate to an access control system 450 to validate mobile credentials 258.

The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The communication module 264 allows for secure bi-directional communication wirelessly with a user device 208. The communication module 264 may implement one or more communication protocols as described in further detail herein.

The user device 208 communicates with the access device 206 and the interconnected systems 400. The communication may occur over a wireless network, such as 802.11x (Wi-Fi), short-range radio (Bluetooth), cellular, satellite, etc. In some embodiments, an interconnected system 400 and the access device 206 may include, or be associated with (e.g., communicatively coupled to) a networked system, such as kiosk, beacon, lantern, bridge, router, network node, building intercom system, etc. The networked system may communicate with the user device 208 using one or more communication protocols or standards. For example, the networked system may communicate with the user device 208 using near field communications (NFC). In an embodiment, the user device 208 may communicated with an access device 206 through a networked system. In other embodiments, the user device 208 may establish communication with an interconnected system 400 or an access device 206 that is not associated with a networked system in the building 202. This connection may be established with various technologies including GPS, 802.11x (Wi-Fi), cellular, or satellite, by way of non-limiting example. In example embodiments, the user device 208 communicates over multiple independent wired and/or wireless networks. Embodiments are intended to cover a wide variety of types of communication between the user device 208, the access device 206 and interconnected system 400, thus embodiments are not limited to the examples provided in this disclosure.

Figure 2:
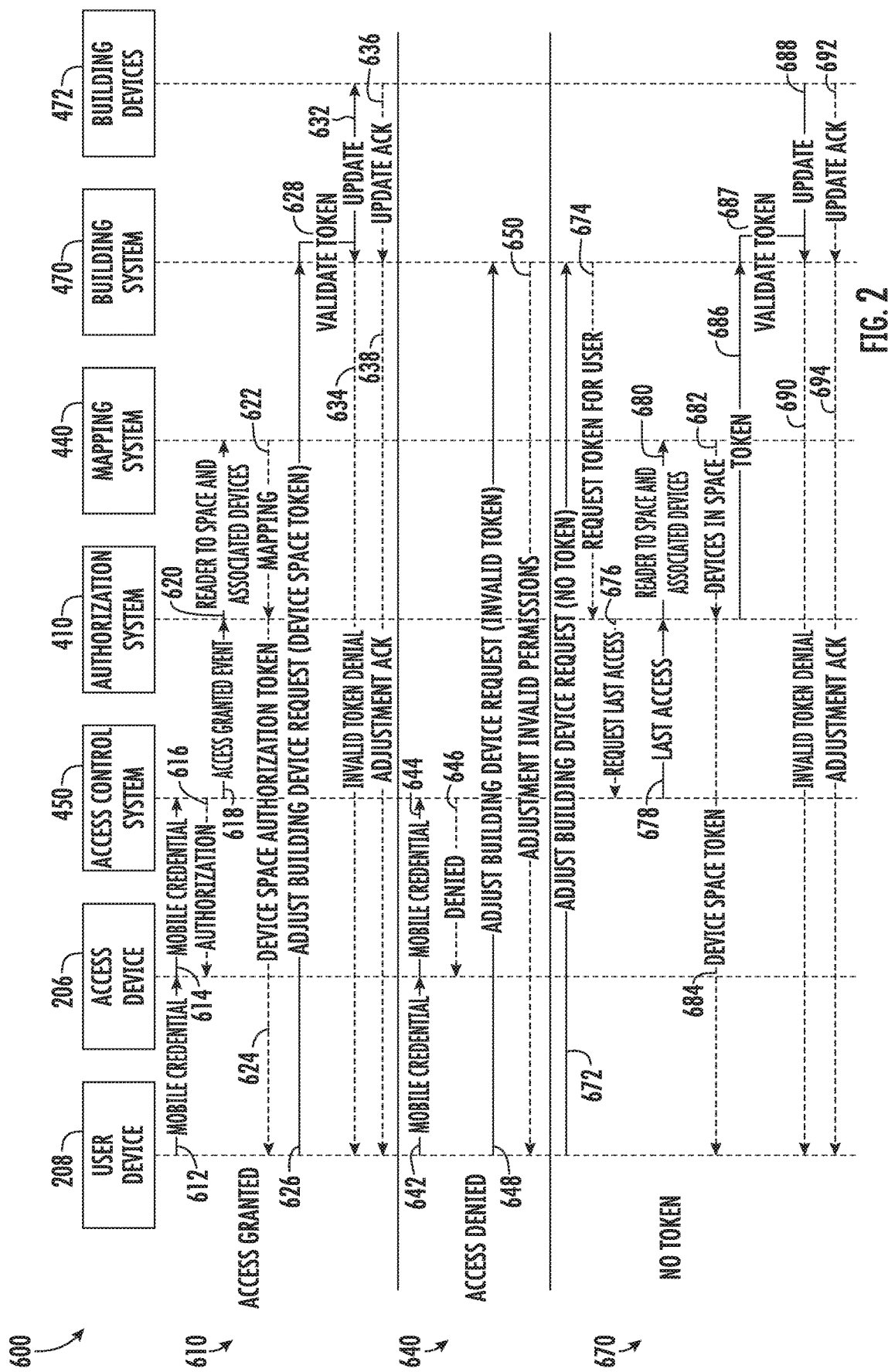
FIG. 2 is a flow diagram illustrating a method of controlling building systems, according to an embodiment of the present disclosure.

Referring now to FIG. 2, while referencing components of FIG. 1. FIG. 2 shows a flow chart of method 600 of controlling building systems, in accordance with an embodiment of the disclosure. The method 600 is composed of three segments include a data collection segments 610, 640 and a data application segment 670.

The data collection segments 610, 640 collect data so that the data application segment 670 may be conducted with increased accuracy. The data collection segments 610, 640 may be repeated multiple times. Moreover, the data collection segments 610, 640 and the data application segment 670 may occur simultaneously and may overlap.

The data collection segments 610, 640 comprises an access granted segment 610 and an access denied segment 640. The access granted segment 610 includes blocks 612-636 and the access denied segment 640 includes blocks 642-650. Advantageously, the authorizations system 410 is configured to build up a history of past usage based on access granted segment 610 and the access denied segments 640 and then quickly allow adjustment of building device 472 without tokens in response to an action request 510 from a user device 208.

The access granted segment 610 including block 610-636 illustrates a sequence of events if the mobile credential 258 is approved. At block 612, a mobile credential 258 is transmitted from the user device 208 to the access device 206, which transmits the mobile credential 258 to the access control system 450 at block 614. The access control system 450 reviews and authorizes the mobile credential 258 to confirm that the mobile credential 258 has proper access to building devices 472 that it is requesting access to at a current position 530 of the user device 208. At block 616, the authorization is transmitted back to the access device 206 and at block 618 an access granted event is transmitted to the authorization system 410. At block 620, the authorization system 410 transmits a request to the mapping system 440 for a building device list 540 in the current position 530 of the user device 208. The current position 530 of the user device 208 may be determined by the positioning system 430 (see FIG. 1) and/or by the strength of signal detection between the user device 208 and any of the interconnected systems 400 or access devices 206. At block 622, the building device list 540 (mapping of building devices 472 at current position 530) is transmitted back to the authorization system 410 from the mapping system 440. At block 624, the authorization system 410 transmits a token 558 to the user device 208. The user device 208 may use the token 558 in order to adjust building devices 472 at the current location 530.

At block 626, the user device 208 may transmit an action request 510 including the token 558 to the building system 470. The building system 470 may act as a communication link between the user device 208 and the building device 472. The building system 470 may translate communications received. In an embodiment, the user device 208 may communicate directly to the building device 472. At block 628, the token 558 is validated. FIG. 2 shows that the token 558 may be validated by the building system 470 but in other embodiments any one of the interconnected systems 400 may validate the token 558. If the token 558 is not validated, a denial will be transmitted back to the user device 208 at block 634. If the token 558 is validated, then at block 632 then an update of the valid token 558 may be transmitted. At block 636, the action request 510 is acknowledged and the building device 472 is adjusted. At block 638, a notification is transmitted back to the user device 208 indicating the acknowledgement and adjustment of the building device 472. An alarm 259 may be activated on the user device 208 when the acknowledgement and adjustment is received. The acknowledgement and adjustment may be displayed on the user device 208 when the acknowledgement and adjustment is received.

The access denied segment 640 including block 642-650 illustrates a sequence of events if the mobile credential 258 is denied. At block 642, a mobile credential 258 is transmitted from the user device 208 to the access device 206, which transmits the mobile credential 258 to the access control system 450 at block 644. The access control system 450 reviews and denies the mobile credential 258, thus confirming that the mobile credential 258 does not have proper access to building devices 472 that it is requesting access to from a current position 530 of the user device 208. At block 646, the denial is transmitted back to the access device 206. At block 648, the user device 208 attempts to submit an action request 510 to the building system 470. As mentioned above, the building system 470 may act as a communication link between the user device 208 and the building device 472. The building system 470 may translate communications received. In an embodiment, the user device 208 may communicate directly to the building device 472. The action request 510 is reviewed and if it is determined that the action request 510 contains an invalid token 558 or no token at all, then a denial is transmitted back to the user device at block 650 indicating that the adjustment was not carried out due to invalid permissions.

The data application 670 segment includes block 672-692 illustrates a sequence of events if the mobile credential 258 is reviewed without a token 558 based a past access granted segment 610 or access denied segment 640. At block 672, an action request 510 is transmitted from the user device 208 to the building system 470 with no token 558. The building system 510 may then transmit the action request 510 along with a request for a valid token 558 to the authorization system 410 at block 674. At block 676, the authorization system 676 checks the access control system 450 for a previous action request 510 that was transmitted from the user device 208 to an access device 206. The previous action request 510 may be the last action request 510. At block 678, the previous action request 510 may be transmitted back to the authorization system 410.

At block 680, the authorization system 410 transmits the previous action request 510 to the mapping system 440 in order to obtain a building device list 540 for a current position 530 of the user device 208 at block 682. The building device list 540 will depict all the building devices 472 that may be adjustable by the user device 208 from the current position 530 of the user device 208. The authorization system 410 determines a token 558 that was used for the previous action request 510 and transmits the token 558 to the user device 208 at block 684 and to the building system 470 at block 686. As mentioned above, the building system 470 may act as a communication link between the user device 208 and the building device 472. The building system 470 may translate communications received. In an embodiment, the user device 208 may communicate directly to the building device 472. At block 687, the token 558 is validated. FIG. 2 shows that the token 558 may be validated by the building system 470 but in other embodiments any one of the interconnected systems 400 may validate the token 558. If the token 558 is not validated, a denial will be transmitted back to the user device 208 at block 690. The denial may be transmitted if the token 558 does not exist and/or a previous action request 510 was denied in the past in an access denied segment 640. If the token 558 is validated, then at block 688 an update of the valid token 558 may be transmitted. At block 692, the action request 510 is acknowledged and the building device 472 is adjusted. At block 694, a notification is transmitted back to the user device 208 indicating the acknowledgement and adjustment of the building device 472. An alarm 259 may be activated on the user device 208 when the acknowledgement and adjustment is received. The acknowledgement and adjustment may be displayed on the user device 208 when the acknowledgement and adjustment is received.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling a building system, the method comprising:
   receiving an action request to adjust a building device of the building system from a user device with no token;
   transmitting the action request along with a request for a valid token to an authorization system;
   obtaining, from the authorization system, a token determined by the authorization system for a previous action request sent by the user device to an access device to adjust the building device when the token exists from the previous action request;
   validating the token from the previous action request; and
   adjusting the building device when the token from the previous action request has been validated;
   wherein prior to the receiving, the method further comprises:
   receiving a mobile credential from a user device;
   authorizing the mobile credential;
   determining a current position of the user device;
   mapping a building device list at the current position, the building device list including one or more building devices adjustable at the current position;
   generating a token for use with each building device;
   transmitting the token and the building device list to the user device;
   receiving a previous action request with the token to adjust a building device from a user device;
   validating the token with the building device; and
   adjusting the building device when the token has been validated;
   wherein the building device includes at least one of a light, a thermostat, a blind, a lock and a computer.

2. The method of claim 1, further comprising:
   transmitting an adjustment acknowledgement to the user device when the building device has been adjusted.

3. The method of claim 2, further comprising:
   activating an alarm on the user device with the adjustment acknowledgement is received.

4. The method of claim 2, further comprising:
   displaying the adjustment acknowledgment on the user device when the adjustment acknowledgement is received.

5. The method of claim 1, wherein prior to the receiving, the method further comprises:
   receiving a mobile credential from a user device;
   denying the mobile credential;
   transmitting the denial to the user device;
   receiving a previous action request with no token to adjust a building device from a user device; and
   denying the previous action request.

6. The method of claim 5, further comprising:
   denying the action request and not adjusting the building device when previous action request has been denied.

7. A building control system comprising:
   a processor; and
   a memory comprising computer-executable instructions that, when executed by the processor, cause the processor to perform operations, the operations comprising:
   receiving an action request to adjust a building device of the building system from a user device with no token;
   transmitting the action request along with a request for a valid token to an authorization system;
   obtaining, from the authorization system, a token determined by the authorization system for a previous action request sent by the user device to an access device to adjust the building device when the token exists from the previous action request;
validating the token from the previous action request; and
adjusting the building device when the token from the previous action request has been validated;
wherein prior to the receiving, the operations further comprises:
receiving a mobile credential from a user device;
authorizing the mobile credential;
determining a current position of the user device;
mapping a building device list at the current position, the building device list including one or more building devices adjustable at the current position;
generating a token for use with each building device;
transmitting the token and the building device list to the user device;
receiving a previous action request with the token to adjust a building device from a user device;
validating the token with the building device; and
adjusting the building device when the token has been validated;
wherein the building device includes at least one of a light, a thermostat, a blind, a lock and a computer.

8. The building control system of claim 7, wherein the operations further comprise:
transmitting an adjustment acknowledgement to the user device when the building device has been adjusted.

9. The building control system of claim 8, wherein the operations further comprise:
activating an alarm on the user device with the adjustment acknowledgement is received.

10. The building control system of claim 8, wherein the operations further comprise:
displaying the adjustment acknowledgment on the user device when the adjustment acknowledgement is received.

11. The building control system of claim 7, wherein prior to the receiving, the operations further comprises:
receiving a mobile credential from a user device;
denying the mobile credential;
transmitting the denial to the user device;
receiving a previous action request with no token to adjust a building device from a user device; and
denying the previous action request.

12. The building control system of claim 11, wherein the operations further comprise:
denying the action request and not adjusting the building device when previous action request has been denied.

13. A computer program product tangibly embodied on a non-transitory computer readable medium, the computer program product including instructions that, when executed by a processor, cause the processor to perform operations comprising:
receiving an action request to adjust a building device of a building system from a user device with no token;
transmitting the action request along with a request for a valid token to an authorization system;
obtaining, from the authorization system, a token determined by the authorization system for a previous action request sent by the user device to an access device to adjust the building device when the token exists from the previous action request;
validating the token from the previous action request; and
adjusting the building device when the token from the previous action request has been validated;
wherein prior to the receiving, the operations further comprises:
receiving a mobile credential from a user device;
authorizing the mobile credential;
determining a current position of the user device;
mapping a building device list at the current position, the building device list including one or more building devices adjustable at the current position;
generating a token for use with each building device;
transmitting the token and the building device list to the user device;
receiving a previous action request with the token to adjust a building device from a user device;
validating the token with the building device; and
adjusting the building device when the token has been validated;
wherein the building device includes at least one of a light, a thermostat, a blind, a lock and a computer.

14. The computer program product of claim 13, wherein the operations further comprise:
transmitting an adjustment acknowledgement to the user device when the building device has been adjusted.

15. The computer program product of claim 14, wherein the operations further comprise:
activating an alarm on the user device with the adjustment acknowledgement is received.

16. The computer program product of claim 14, wherein the operations further comprise:
displaying the adjustment acknowledgment on the user device when the adjustment acknowledgement is received.

17. The computer program product of claim 13, wherein prior to the receiving, the operations further comprises:
receiving a mobile credential from a user device;
denying the mobile credential;
transmitting the denial to the user device;
receiving a previous action request with no token to adjust a building device from a user device; and
denying the previous action request.

* * * * *